United States Patent
Kanenari

(10) Patent No.: US 9,452,646 B2
(45) Date of Patent: Sep. 27, 2016

(54) TRANSMITTING DEVICE, TIRE CONDITION MONITORING SYSTEM, AND TIRE ASSEMBLY

(71) Applicant: The Yokohama Rubber Co., LTD., Minato-ku, Tokyo (JP)

(72) Inventor: Daisuke Kanenari, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/410,047

(22) PCT Filed: Jul. 22, 2013

(86) PCT No.: PCT/JP2013/069786
§ 371 (c)(1),
(2) Date: Dec. 19, 2014

(87) PCT Pub. No.: WO2014/017435
PCT Pub. Date: Jan. 30, 2014

(65) Prior Publication Data
US 2015/0191054 A1 Jul. 9, 2015

(30) Foreign Application Priority Data
Jul. 24, 2012 (JP) ................................ 2012-164047

(51) Int. Cl.
*B60C 23/00* (2006.01)
*B60C 23/04* (2006.01)

(52) U.S. Cl.
CPC ........... *B60C 23/04* (2013.01); *B60C 23/0494* (2013.01)

(58) Field of Classification Search
CPC .......... B60C 23/0408; B60C 23/0494; B60C 23/0409; B60C 23/04; B60C 23/02; B60C 23/00; B60C 23/06; G03F 7/70341; G07C 5/008; B60R 1/12

USPC ............ 340/445, 442, 447; 73/146.8, 146.5, 73/146, 146.4
See application file for complete search history.

(56) References Cited

U.S. PATENT DOCUMENTS 5,774,048 A    6/1998   Achterholt
7,307,687 B2 * 12/2007 Quaedackers ...... G03F 7/70341
                                                 355/30

(Continued)

FOREIGN PATENT DOCUMENTS

JP    2004-262291    9/2004
JP    2004-330842    12/2004

(Continued)

OTHER PUBLICATIONS

International Search Report for International Application No. PCT/JP2013069786 dated Oct. 22, 2013, 6 pages, Japan.

*Primary Examiner* — Hoi Lau
(74) *Attorney, Agent, or Firm* — Thorpe North & Western

(57) ABSTRACT

A transmitting device in a tire condition monitoring system includes a sensor having a plane sensor detecting face that senses tire information; a transmitter that wirelessly transmits the tire information; and a housing within which the sensor and the transmitter are provided, that includes an internal space in contact with the sensor detecting face of the sensor, and a ventilation hole that communicates with the internal space and the tire cavity region and that extends in a linear manner. An inside opening part of the ventilation hole is inclined with respect to the sensor detecting face, and is provided on the wall surface of the internal space that extends parallel to the sensor detecting face. An angle θ between the extension direction of the ventilation hole extending from the internal space to the tire cavity region and the normal line direction of the sensor detecting face is 10°≤θ≤120°.

16 Claims, 12 Drawing Sheets

(56) References Cited

U.S. PATENT DOCUMENTS

| | | | | |
|---|---|---|---|---|
| 8,471,694 B2* | 6/2013 | Kanenari | ............ | B60C 23/0408 340/442 |
| 8,707,778 B2* | 4/2014 | Kanenari | ............ | B60C 23/0408 73/146.8 |
| 8,760,278 B2* | 6/2014 | Kanenari | ............ | B60C 23/0494 340/445 |
| 8,820,154 B2* | 9/2014 | Kanenari | ............ | B60C 23/0494 340/445 |
| 2004/0178898 A1* | 9/2004 | Ito | ............ | B60C 23/0408 340/445 |
| 2006/0028331 A1* | 2/2006 | Ito | ............ | B60C 23/0408 340/445 |
| 2008/0055059 A1* | 3/2008 | Murakami | ............ | B60C 23/0408 340/442 |
| 2008/0094196 A1* | 4/2008 | Liao | ............ | B60C 23/0408 340/447 |
| 2008/0121032 A1* | 5/2008 | Qiu | ............ | B60C 23/0494 73/146.8 |
| 2008/0127724 A1* | 6/2008 | Qiu | ............ | B60C 23/0494 73/146.8 |
| 2010/0328059 A1* | 12/2010 | Kanenari | ............ | B60C 23/0494 340/447 |
| 2012/0222478 A1* | 9/2012 | Kanenari | ............ | B60C 23/0408 73/146.5 |
| 2012/0229266 A1* | 9/2012 | Kanenari | ............ | B60C 23/0494 340/445 |
| 2012/0234086 A1* | 9/2012 | Kanenari | ............ | B60C 23/0494 73/146 |
| 2012/0235808 A1* | 9/2012 | Kanenari | ............ | B60C 23/0494 340/445 |
| 2013/0298658 A1* | 11/2013 | Kanenari | ............ | B60C 23/0494 73/146.4 |
| 2014/0159889 A1* | 6/2014 | Kanenari | ............ | B60C 23/0494 340/447 |

FOREIGN PATENT DOCUMENTS

| | | |
|---|---|---|
| JP | 2006-329772 | 12/2006 |
| JP | 2007-239576 | 9/2007 |
| JP | 2008-062730 | 3/2008 |
| JP | 2011-127548 | 6/2011 |
| JP | 4743336 | 8/2011 |
| JP | 2012-011904 | 1/2012 |

* cited by examiner

TRANSMITTING DEVICE, TIRE CONDITION MONITORING SYSTEM, AND TIRE ASSEMBLY

TECHNICAL FIELD

The present technology relates to a transmitting device provided in the tire cavity region that transmits tire information regarding the tire condition, a tire condition monitoring system using the transmitting device, and a tire assembly.

BACKGROUND

Conventionally, inspecting and managing air pressure of tires mounted on vehicles has been desirable from the perspectives of enhancing tire durability, wear resistance, fuel economy, riding comfort, and driving performance. Therefore, various systems for monitoring air pressure of tires have been proposed. Generally, in these systems, air pressure in tires is monitored by detecting the air pressure information of a tire assembled on a wheel, providing a transmitting device for transmitting this information in a tire cavity region of each wheel, and acquiring the air pressure information of each tire from the transmitting devices.

Puncture repair liquid to be injected within the tire cavity region interposed between the tire and the rim is often used when a puncture occurs in a tire. Since the puncture repair liquid is in a liquid form, the puncture repair liquid adheres to the inner surface of the tire that faces the tire cavity region and may even adhere to the transmitting device provided in the tire cavity region when the puncture repair liquid is injected into the tire cavity region. In some cases, the puncture repair liquid solidifies and covers an opening provided in the transmitting device, thus becoming a problem that adversely affects the measurement of the air pressure.

To solve this problem, a wheel condition detecting device that can prevent the ingress of foreign material from a communicating portion for detection, and maintain normal detecting status has been proposed (Japanese Unexamined Patent Application Publication No. 2008-62730A).

Specifically, a communicating portion opening and closing mechanism that opens and closes a communication hole provided in a case is provided on the valve in a tire pressure monitoring system (TPMS) of a wheel condition detecting device. When repairing a puncture, the puncture repair liquid is prevented from penetrating into the detection space through the communication hole. This communicating portion opening and closing mechanism is configured so as to include a mechanical mechanism containing a lid body and a screw coil spring, and the communication hole is automatically opened and closed by centrifugal force that acts on a wheel.

Also, a transmitting device that is capable of appropriately detecting and transmitting tire information such as tire air pressure information and the like and a tire information monitoring system that is capable of determining whether or not there is an abnormality in the tire, even when the puncture has been repaired using puncture repair liquid, are known (Japanese Unexamined Patent Application Publication No. 2010-150941A).

The transmitting device includes a sensor that detects the condition of the air filling the tire cavity region as tire information, a transmitter that wirelessly transmits the detected tire information, and a wall that covers the sensor and transmitter. A housing provides an internal space partitioned from the tire cavity region by the wall of the housing. A ventilation hole is provided in the housing that penetrates the wall and communicates to internal space and the tire cavity region. In this case, the opening area of the ventilation hole on the surface of the housing facing the tire cavity region is not more than 0.4 mm$^2$, and the opening area of the inside opening part of the ventilation hole on the surface of the housing facing the internal space is larger compared with that of the outside opening part.

However, the communicating portion opening and closing mechanism of the wheel condition detecting device as described above is configured from a mechanical mechanism that includes a lid and a screw coil spring, so there is a problem that the device itself is complex, and expensive.

On the other hand, in the transmitting device of the tire information monitoring system, even if a puncture has been repaired using puncture repair liquid, it is still possible to appropriately detect the tire information such as the tire air pressure information and the like, but the opening area of the outside opening part is not more than 0.4 mm$^2$, so precise and accurate processing is necessary.

SUMMARY

The present technology provides a transmitting device using a form that is different from the transmitting device of the tire information monitoring system as described above, that is capable of properly detecting tire information such as tire air pressure information and the like even when a puncture in the tire has been repaired using puncture repair liquid; an information monitoring system using the transmitting device that determines whether or not there is an abnormality in the tire; and a tire assembly.

One aspect of the present technology is a transmitting device provided in a tire cavity region for transmitting tire information regarding a condition of a tire. The transmitting device comprises, a sensor having a plane sensor detecting face that senses as tire information the condition of air filling the tire cavity region enclosed by the tire and a rim;

a transmitter that wirelessly transmits the detected tire information; and a housing within which the sensor and the transmitter are provided, that includes an internal space in contact with the sensor detecting face of the sensor, and a ventilation hole that communicates with the internal space and the tire cavity region and that extends in a linear manner.

An inside opening part of the ventilation hole that faces the internal space is inclined with respect to the sensor detecting face, and, is provided on a wall surface of the internal space, the wall surface extending in the direction perpendicular to both the extension direction of the ventilation hole and the normal line direction of the sensor detecting face.

The angle θ between the extension direction of the ventilation hole and the normal line direction of the sensor detecting face is not less than 10 degrees and not more than 120 degrees.

Another aspect of the present technology is a tire assembly. The tire assembly comprises, a tire;

a rim fitted to the tire; and a transmitting device provided in a tire cavity region between the tire and the rim, and that transmits tire information regarding the tire condition.

The transmitting device comprises, a sensor having a plane sensor detecting face that senses as tire information the condition of air filling the tire cavity region enclosed by the tire and the rim;

a transmitter that wirelessly transmits the detected tire information; and a housing within which the sensor and the transmitter are provided, that includes an internal space in contact with the sensor detecting face of the sensor, and a ventilation hole that communicates with the internal space and the tire cavity region and that extends in a linear manner.

An inside opening part of the ventilation hole that faces the internal space is inclined with respect to the sensor detecting face, and, is provided on a wall surface of the internal space, the wall surface extending in the direction perpendicular to both the extension direction of the ventilation hole and the normal line direction of the sensor detecting face.

The angle θ between the extension direction of the ventilation hole and the normal line direction of the sensor detecting face is not less than 10 degrees and not more than 120 degrees.

Also, another aspect of the present technology is a tire condition monitoring system.

The system comprises a transmitting device, a receiving device, and a monitoring unit.

The transmitting device comprises, a sensor having a plane sensor detecting face that senses as tire information the condition of air filling the tire cavity region enclosed by the tire and a rim;

a transmitter that wirelessly transmits the detected tire information; and a housing within which the sensor and the transmitter are provided, that includes an internal space in contact with the sensor detecting face of the sensor, and a ventilation hole that communicates with the internal space and the tire cavity region and that extends in a linear manner.

In this case, an inside opening part of the ventilation hole that faces the internal space is inclined with respect to the sensor detecting face, and, is provided on a wall surface of the internal space, the wall surface extending in the direction perpendicular to both the extension direction of the ventilation hole and the normal line direction of the sensor detecting face, and the angle θ between the extension direction of the ventilation hole and the normal line direction of the sensor detecting face is not less than 10 degrees and not more than 120 degrees.

The receiving device receives the tire information transmitted by the transmitter.

The monitoring unit determines the presence or absence of an abnormality of the tire on the basis of the tire information, and reports the determined results.

In each of the aspects of the transmitting device, the transmitting device of the tire assembly, and the transmitting device of the system, when a projection region is a region on the inner wall surface obtained by projecting the sensor detecting face along the normal line direction onto the inner wall surface of the internal space, preferably the maximum height $H_1$ of the heights of the inner wall surface of the internal space measured along the normal line direction with reference to the sensor detecting face is higher compared with the maximum height $H_2$ of the heights of the projection region measured along the normal line direction with reference to the sensor detecting face.

In each of the aspects of the transmitting device, the transmitting device of the tire assembly, and the transmitting device of the system, preferably when the ventilation hole is extended virtually into the internal space, the virtually extended portion of the ventilation hole contacts the inner wall surface of the housing facing the internal space, not the sensor detecting face.

Also, in each of the aspects of the transmitting device, the transmitting device of the tire assembly, and the transmitting device of the system, preferably an outside opening part of the ventilation hole facing the tire cavity region is provided on an inclined face of a part that projects from the outer wall surface of the housing, the inclined face being inclined with respect to the sensor detecting face.

In each of the aspects of the transmitting device, the transmitting device of the tire assembly, and the transmitting device of the system, preferably the internal space is a space defined by the inner wall surface in the projection of the housing, and the peripheral surface of the sensor including the sensor detecting face.

The transmitting device, the transmitting device of the tire assembly, and the transmitting device of the system are provided connected to a tire valve for filling the tire with air.

When the center position of an air inlet on the tire cavity region side at which the air is introduced into the tire cavity region from the tire valve, a center position of the outside opening part of the ventilation hole facing the tire cavity region, and a center position of the inside opening part are viewed planarly from the direction normal to the sensor detecting face, and a virtual plane is considered normal to the straight line from the center position of the air inlet towards the center position of the outside opening part, the virtual plane passing through the center position of the outside opening part, preferably the center position of the inside opening part is positioned on the same side as the center position of the air inlet of a virtual line corresponding to the virtual plane when viewed planarly from the direction normal to the sensor detecting face as boundary.

In each of the aspects of the transmitting device, the transmitting device of the tire assembly, and the transmitting device of the system, preferably a maximum height region having the maximum height of the inner wall surface of the internal space measured with reference to the sensor detecting face is positioned between the inside opening part of the ventilation hole and the sensor detecting face when the maximum height region, the ventilation hole, and the sensor detecting face are viewed planarly from the direction normal to the sensor detecting face.

In each of the aspects of the transmitting device, the transmitting device of the tire assembly, and the transmitting device of the system, preferably the angle between the normal line direction of the sensor detecting face and the outer side direction of the tire radial direction is between 0 degrees and 15 degrees.

According to the transmitting device, the tire assembly, and the tire conditioning monitoring system of the present technology, even when a puncture in the tire has been repaired using puncture repair liquid it is still possible to properly detect tire information such as tire air pressure information and the like, and to transmit the tire information from the transmitting device.

DETAILED DESCRIPTION

The following is a description of the transmitting device, tire condition monitoring system, and tire assembly according to the present technology based on embodiments illustrated on the attached drawings.

Overview of the Tire Air Pressure Monitoring System

Figure 1:
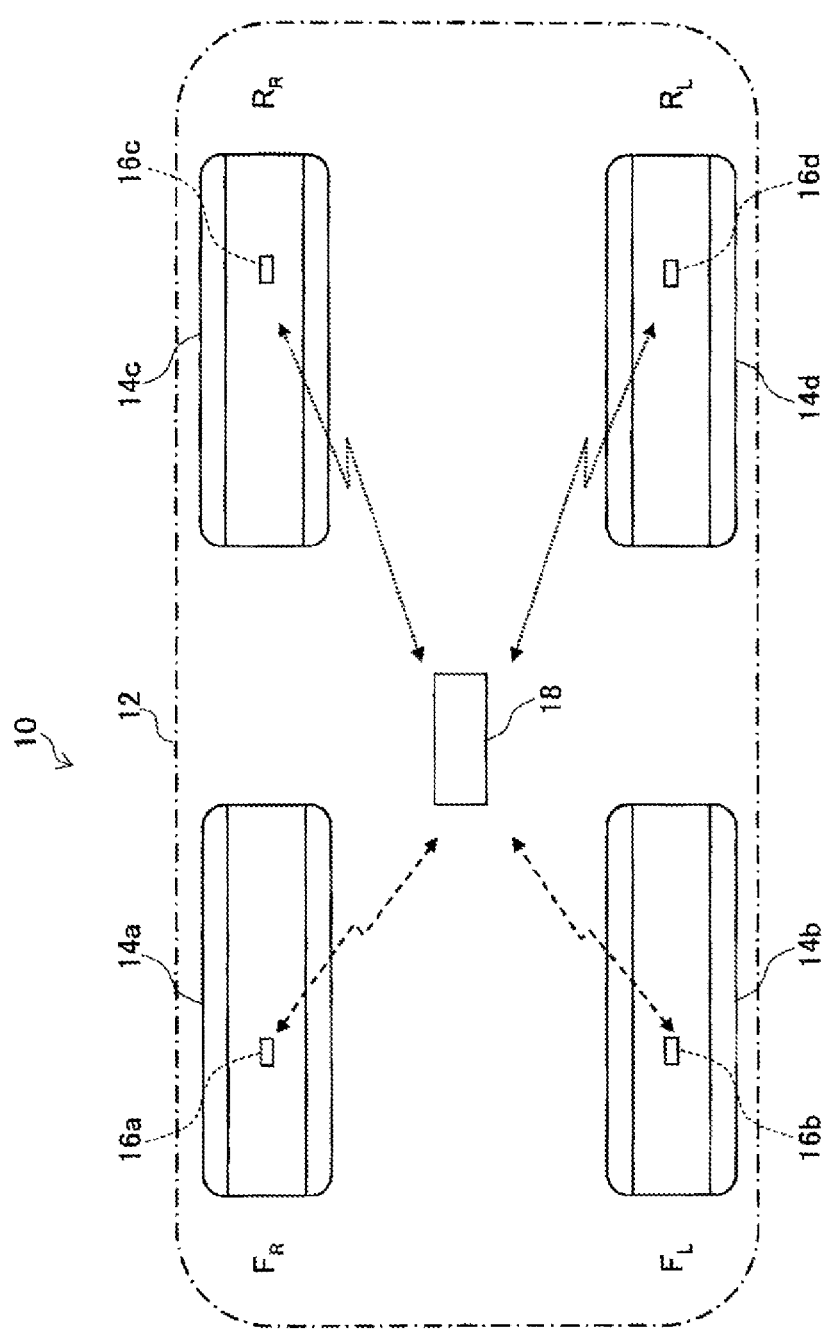
FIG. 1 is an overview of a tire air pressure monitoring system according to an embodiment of a tire condition monitoring system.

FIG. 1 illustrates an overview of a whole tire air pressure monitoring system 10 according to an embodiment of a tire information monitoring system.

The tire air pressure monitoring system (hereinafter referred to as the "system") 10 is installed in a vehicle 12. The system 10 includes air pressure information transmitting devices (hereinafter referred to as the "transmitting devices") 16a, 16b, 16c, and 16d provided in each tire cavity region of tires 14a, 14b, 14c, and 14d of the vehicle 12; and a monitoring device 18.

Each of the transmitting devices 16a, 16b, 16c, 16d is surrounded by the tire 14 and a rim 19 (see FIG. 2), and detects information regarding the pressure of the air filling the tire cavity region as tire information, and transmits the tire information wirelessly to the monitoring device 18. Hereafter, when describing the transmitting devices 16a, 16b, 16c, 16d collectively, the transmitting devices 16a, 16b, 16c, 16d are referred to collectively as the transmitting device 16.

Configuration of the Transmitting Device

Figure 2:
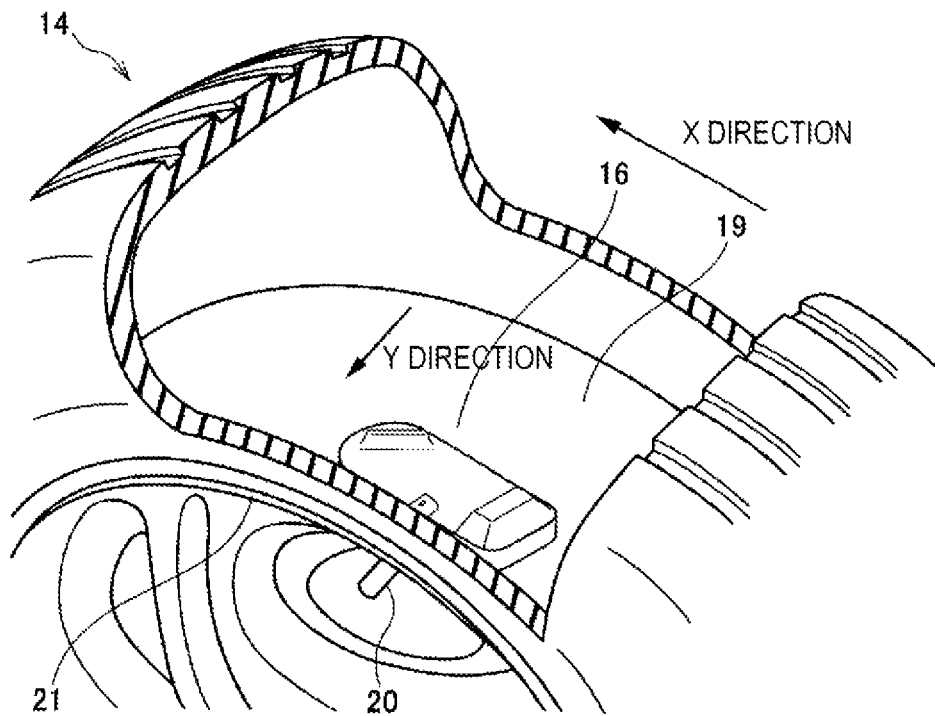
FIG. 2 is an explanatory view of an example of tire assembly in which the transmitting device illustrated in FIG. 1 is fixed within the tire cavity region.
Figure 3:
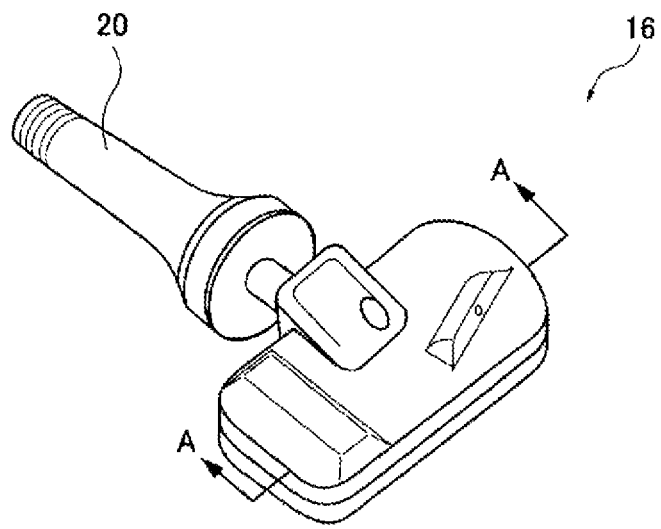
FIG. 3 is a perspective view of the whole device in which the transmitting device illustrated in FIG. 2 is integrated with the tire valve.

FIG. 2 is an explanatory view of an example of tire assembly in which the transmitting device 16 is fixed within the tire cavity region. FIG. 3 is a perspective view of the whole device in which the transmitting device 16 illustrated in FIG. 2 is integrated with a tire valve 20.

The tire assembly includes the tire 14, the rim 19, and the transmitting device 16. The rim 19 is fitted to the tire 14. As described later, the transmitting device 16 is provided in the tire cavity region between the tire 14 and the rim 19, and transmits tire information.

Specifically, the transmitting device 16 is provided on the tip of the tire valve 20 that extends on the side of the tire cavity region, and as illustrated in FIG. 2, the tire valve 20 is mechanically fixed to the rim 19, and is disposed fixed within the tire cavity region. Also, the transmitting device 16 includes a housing 22 that extends in the circumferential direction (the X direction in FIG. 2) of the tire 14. The circumferential direction of the tire 14 is the rotating direction of the tread portion, in other words, the rotating direction of the tire 14 when the tread portion of the tire 14 is rotated around the tire rotational axis.

Also, in the present embodiment, the tire valve 20 is provided extending in a direction (the Y direction in FIG. 2) normal to the rotating direction (the X direction in FIG. 2) of the circumferential direction of the tire 14. The tire radial direction refers to the direction perpendicular to the X direction and the Y direction, and the outer side direction of the tire radial direction refers to the direction away from the rotational axis of the tire.

Figure 4:
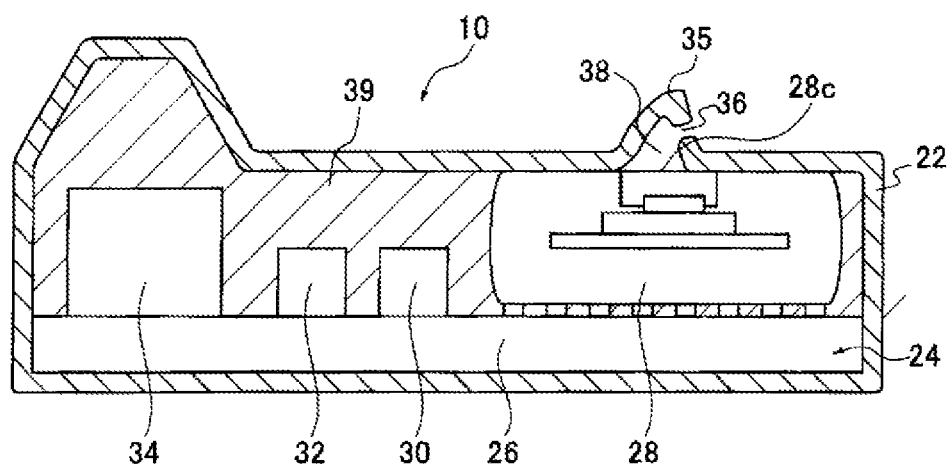
FIG. 4 is a cross-sectional view of the transmitting device illustrated in FIG. 3 along the line A-A.

FIG. 4 is a cross-sectional view of the transmitting device 16 along the line A-A in FIG. 3. As illustrated in FIG. 4, the transmitting device 16 includes a housing 22, and circuits 24 provided within the housing 22. The circuits 24 include a substrate 26, a sensor unit 28 provided on the substrate 26, a transmitter 30, a processing unit 32, a power supply unit 34, and an antenna 40 (see FIG. 5). An internal space 38 is provided within the interior of the housing 22.

The sensor unit 28 includes a sensor detecting face 28c for detecting the air pressure, and the sensor detecting face 28c is a wall surface that faces the internal space 38. Therefore, the sensor unit 28 can sense the pressure of the internal space 38.

A ventilation hole 36 that allows communication between the internal space 38 in the housing 22 and the tire cavity region is provided in the housing 22 so as to penetrate the wall of the housing 22. A projection 35 that projects from the outer wall surface is provided on the outer wall surface of the housing 22, and the internal space 38 is provided on the inside of the projection 35. The ventilation hole 36 is provided on an inclined face of the projection 35 of the housing 22. The ventilation hole 36 is a hole that communicates with the internal space 38 and the tire cavity region. The internal space 38 is defined by a peripheral surface that includes the inner wall surface of the projection 35 of the housing 22, and the sensor detecting face 28c of the sensor unit 28. The gap between the inner wall surface of the housing 22 and the circuits 24 is filled with sealing resin 39 except for the internal space 38. The sensor detecting face 28c is oriented to the outer side direction in the tire radial direction so that in the event that a drop of puncture repair liquid unexpectedly impacts and adheres to the sensor detecting face 28c, the puncture repair liquid is moved towards the outer side in the tire radial direction by the centrifugal force produced by rotation of the tire. In the present embodiment, preferably the angle formed between the orientation (normal line direction) of the sensor detecting face 28c and the outer side direction in the tire radial direction is between 0 degrees and 15 degrees. Therefore, preferably the sensor 28 is provided in the housing 22 so that the upper limit of the angle between the normal line direction of the sensor detecting face 28c and the outer side direction in the tire radial direction is 15 degrees.

The cross-sectional area of the ventilation hole 36 provided in the projection 35 of the housing 22 is constant along the extension direction of the ventilation hole 36. An inside opening part of the ventilation hole 36 facing the internal space 38 is oriented in a direction that is inclined with respect to the sensor detecting face 28c, and, is provided on a wall surface of the internal space 38 that extends in the direction perpendicular to both the extension direction of the ventilation hole 36 and the normal line direction of the sensor detecting face 28c (the direction normal to the plane of the paper in FIG. 4). Here, the wall surface of the internal space 38 that extends in the direction normal to the plane of the paper in FIG. 4 includes curved surfaces, as well as plane surfaces that extend in the direction normal to the plane of the paper in FIG. 4. In addition, the angle formed between the extension direction of the ventilation hole 36 extending from the internal space 38 into the tire cavity region and the normal line direction of the sensor detecting face 28c that senses the air of the sensor unit 28 is not less than 10 degrees and not more than 120 degrees, and preferably not less than 30 degrees and not more than 120 degrees. The positional relationship among the ventilation hole 36, the internal space 38, and the sensor detecting face 28c is described in detail later.

Figure 5:
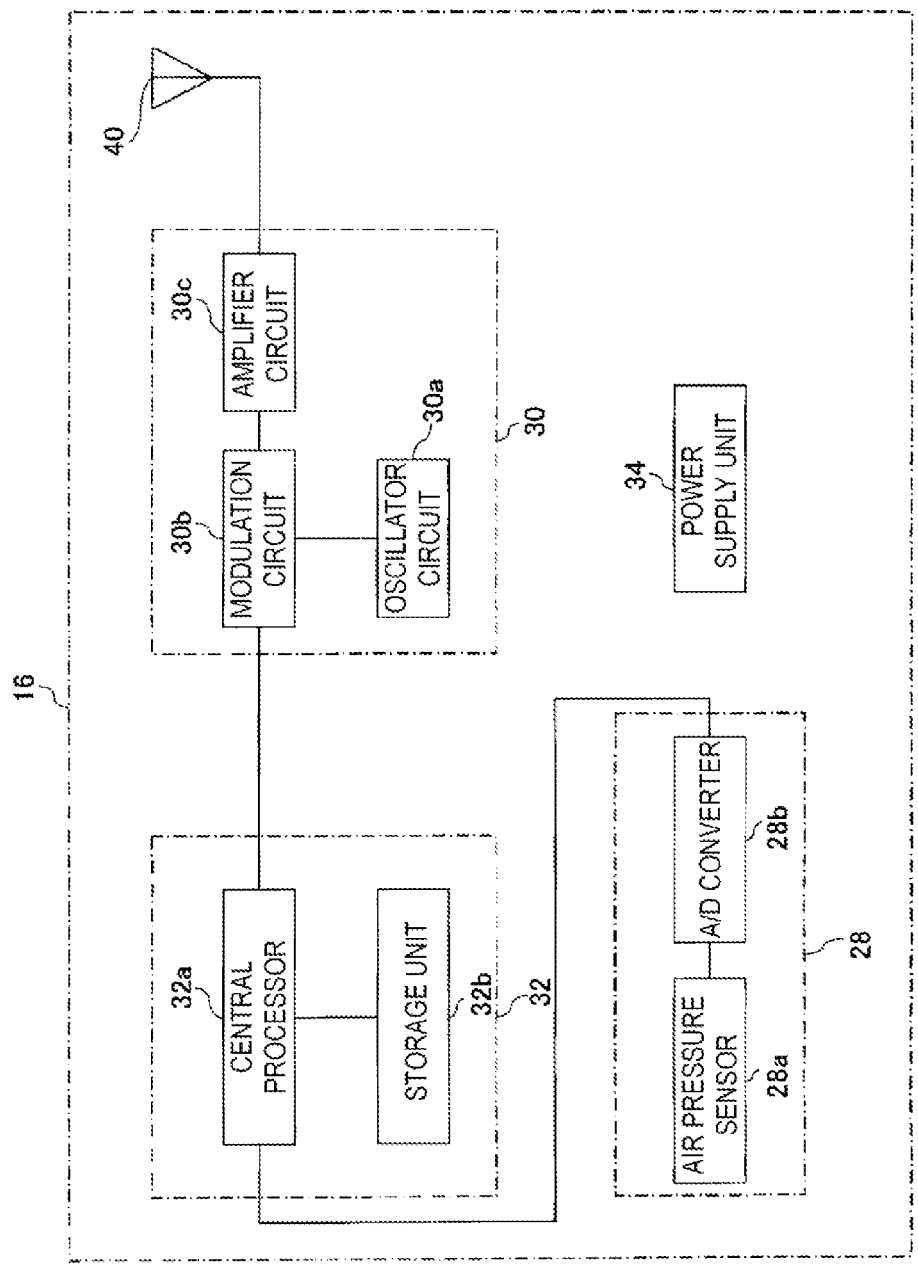
FIG. 5 is a circuit configuration of the transmitting device illustrated in FIG. 1.

FIG. 5 is a circuit diagram of the transmitting device 16.

The sensor unit 28 includes an air pressure sensor 28a and an A/D converter 28b. The air pressure sensor 28a senses the air pressure of an internal space 38 within the housing 22 and outputs a pressure signal. Since the internal space 38 communicates with the tire cavity region via the ventilation hole 36, the air pressure sensor 28a is able to sense the air pressure in the tire cavity region.

The A/D converter 28b digitizes the pressure signal output from the air pressure sensor 28a and outputs a pressure datum.

The processing unit 32 includes a central processor 32a and a storage unit 32b. The central processor 32a operates based on programs saved in semiconductor memory of the storage unit 32b. When the central processor 32a is powered to drive, the central processor 32a controls so as to transmit the pressure data received from the sensor unit 28 as the air pressure information to the monitoring device 18 via the transmitter 30 at a predetermined time interval such as every five minutes. Unique identifying information of the transmitting device 16 is stored in advance in the storage unit 32b and the central processor 32a is controlled so as to transmit the pressure data together with the identifying information to the monitoring device 18.

The storage unit 32b comprises Read Only Memory (ROM) in which the programs that operate the central processor 32a are stored and rewritable non-volatile memory such as, for example, Electrically Erasable Programmable Read-Only Memory (EEPROM) and the like. The unique identifying information of the transmitting device 16 is stored in a region of the storage unit 32b that is not rewritable.

The transmitter 30 includes an oscillator circuit 30a, a modulation circuit 30b, and an amplifier circuit 30c.

The oscillator circuit 30a generates a carrier wave signal, for example, a radio frequency (RF) signal having a frequency in the 315 MHz band.

The modulation circuit 30b generates a transmission signal by using the pressure data and the unique identifying information of the transmitting device 16 received from the central processor 32a to modulate a carrier wave signal. Examples of a modulation method that can be used include amplitude shift keying (ASK), frequency modulation (FM), frequency shift keying (FSK), phase modulation (PM), phase shift keying (PSK), and the like.

The amplifier circuit 30c amplifies the transmission signal generated by the modulator circuit 30b. The amplified transmission signal is transmitted wirelessly through the antenna 40 to the monitoring device 18.

The power supply unit 34 uses a secondary battery, for example, to provide electrical power to the sensor unit 28, the transmitter 30, and the processing unit 32.

Configuration of the Monitoring Device

Figure 6:
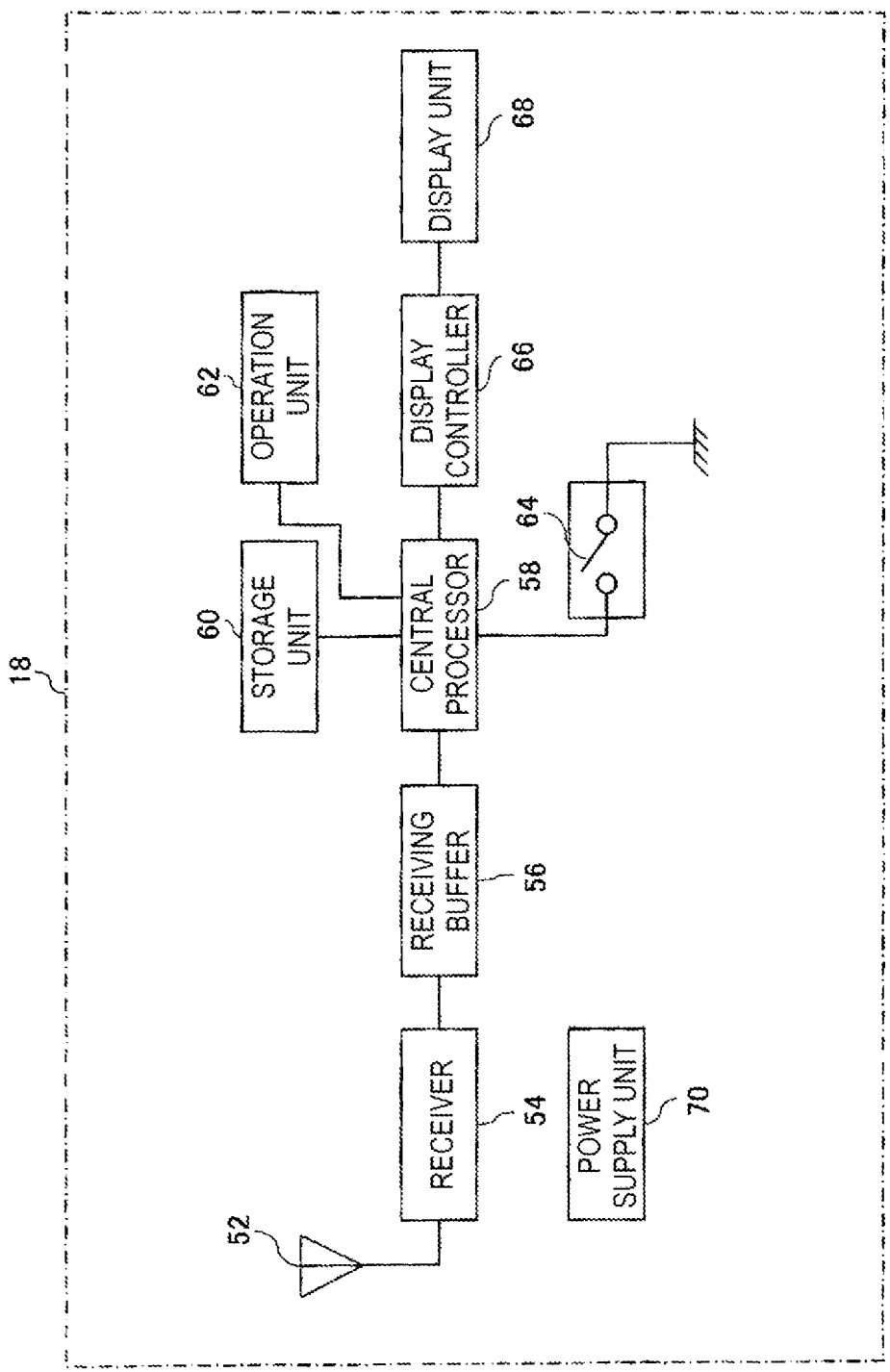
FIG. 6 is a circuit configuration of the monitoring device illustrated in FIG. 1.

FIG. 6 is a circuit configuration of the monitoring device 18.

The monitoring device 18 is disposed, for example, at the location of the driver's seat in the vehicle 10 and reports air pressure information to the driver. The monitoring device 18 includes an antenna 52, a receiver 54, a receiving buffer 56, a central processor 58, a storage unit 60, an operation unit 62, a switch 64, a display controller 66, a display unit 68, and a power supply unit 70.

The antenna 52 is aligned to the same frequency as the transmission frequency of the transmitting device 16 and is connected to the receiver 54.

The receiver 54 receives the transmission signal at a certain frequency transmitted by the transmitting device 16, conducts demodulation, and extracts data including the pressure data and the identifying information. The data is outputted to the receiving buffer 56.

The receiving buffer 56 temporarily saves the pressure datum and the identification information datum output from the receiver 54. The saved pressure datum and identification information datum are output to the central processor 58 in accordance with an instruction from the central processor 58.

The central processor 58 is primarily constructed of a CPU and operates based on programs stored in the storage unit 60. The central processor 58 monitors the air pressure of the tires 14a to 14d for each instance of identification information based on the received pressure datum and identification information datum. Specifically, the central processor 58 determines the presence or absence of an abnormality of the tires 14a to 14d on the basis of the pressure data, and reports the determined results to the driver. "Determines the presence of abnormalities" means, for example, determining whether the tire has been punctured based on abnormally low air pressure or a sudden decline in air pressure over a short period of time.

The central processor 58 outputs the determined results to the display controller 66 and the determined results are displayed on the display unit 68 via the display controller 66.

Moreover, the central processor 58 initializes the communication protocol between itself and the transmitting device 16 in response to information from the operation unit 62 and information from the switch 64. The setting of a determination condition for determining the presence or absence of a tire abnormality by the central processor 58 may be conducted based on information from the operation unit 62.

The storage unit 60 includes Read Only Memory (ROM) in which the programs that operate the CPU of the central processor 58 are stored and non-volatile memory such as, for example, Electrically Erasable Programmable Read-Only Memory (EEPROM) and the like. A table including the communication protocol with the transmitting device 16 is stored in the storage unit 60 at the manufacturing stage. The transmitting device 16 and the monitoring device 18 communicate in the initial stage with a preset communication protocol. The communication protocol table contains information such as communication protocols, transfer bit rates, data formats, and the like, associated with the unique identifying information of each of transmitting device 16. The information may be freely changed with an input from the operation unit 62.

The operation unit 62 includes an input device such as a keyboard, and is used for inputting various types of information and conditions. The switch 64 is used for instructing the central processor 58 to start initialization.

The display controller 66 controls the display unit 68 to display tire air pressure associated with the mounting position of the tires 14a to 14d in accordance with the determined result from the central processor 58. The display controller 66 controls the display unit 68 to display the determined result that indicates the tire puncture condition at the same time.

The power supply unit 70 supplies electrical power through a power source line, not illustrated, by controlling the electrical power supplied from a battery mounted in the vehicle 10 at a voltage suitable for each unit of the monitoring device 18.

The transmitting device 16 and the monitoring device 18 are configured as described above.

Transmitting Device Ventilation Hole, Internal Space, and Sensor detecting Face

Figure 7:
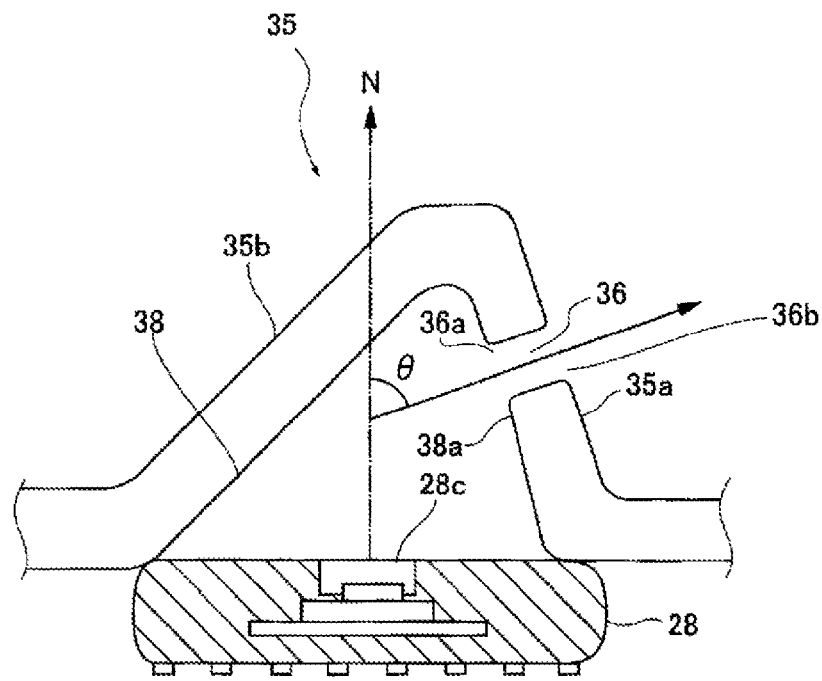
FIG. 7 is an enlarged schematic view around the projection illustrated in FIG. 4.
Figure 8:
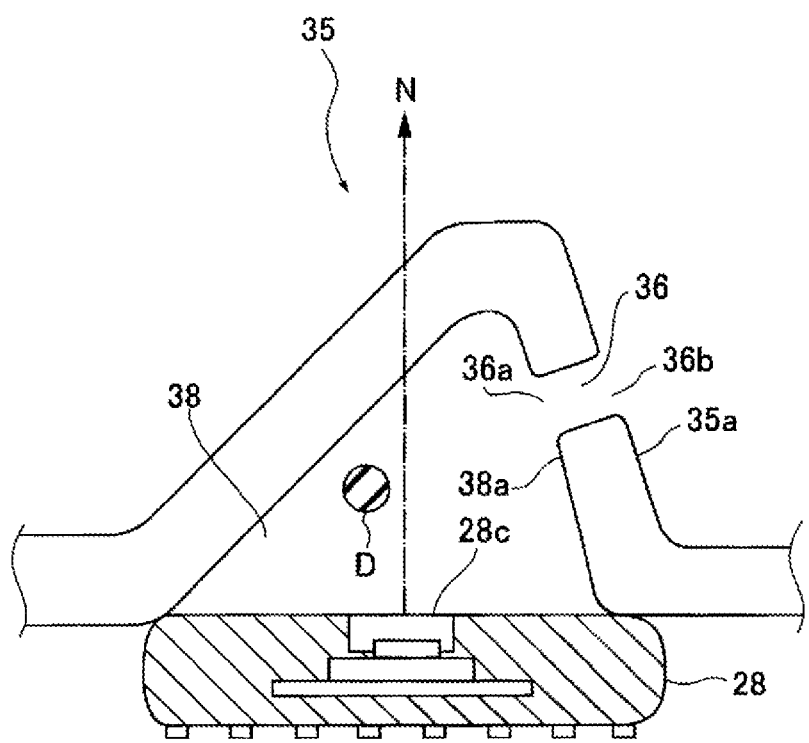
FIG. 8 is an explanatory view illustrating the area around the projection illustrated in FIG. 4 enlarged into which a drop of the puncture repair liquid has penetrated.

FIGS. 7 and 8 schematically illustrate an enlargement of the area around the projection 35 illustrated in FIG. 4. In FIGS. 7 and 8, the projection 35 is illustrated larger compared with the sensor unit 28, in order to emphasize the projection 35. FIG. 8 is an explanatory view illustrating the area around the projection 35 illustrated in FIG. 4 into which a drop of the puncture repair liquid has penetrated.

Here, an inside opening part 36a of the ventilation hole 36 facing the internal space 38 is provided on the wall surface 38a of the internal space 38. The wall surface 38a is oriented in a direction that is inclined with respect to the sensor detecting face 28c, and extends in a direction perpendicular to both the extension direction of the ventilation hole 36 and the direction of the normal line of the sensor detecting face 28c (direction N in FIG. 7). In addition, the angle θ (see FIG. 7) between the extension direction of the ventilation hole 36 extending from the internal space 38 to the tire cavity region (the direction indicated by the arrow in FIG. 7), and the normal line direction of the sensor detecting face 28c which senses the air of the sensor unit 28 (the direction N in FIG. 7) is not less than 10 degrees and not more than 120 degrees. Of the inclined faces 35a, 35b of the projection 35, the ventilation hole 36 is provided on the inclined face 35a with the greatest inclination.

By using the ventilation hole 36 with this configuration, as illustrated in FIG. 8, even if the drop D of puncture repair liquid penetrates into the internal space 38 through the ventilation hole 36, the extension direction of the ventilation hole 36, which is located above the sensor detecting face 28c in FIG. 7, is inclined with respect to the normal line direction of the sensor detecting face 28c with an angle θ between 10 degrees and 120 degrees, so the drop D will contact the inner wall surface of the internal space 38 opposite the inside opening part 36a and the drop D will impact a position on the inner wall surface separated from the sensor detecting face 28c and spread into a film. On the other hand, the inside opening part 36a is oriented at an inclination with respect to the sensor detecting face 28c, and, is provided on the wall surface 38a of the internal space 38 that extends in the direction perpendicular to both the extension direction of the ventilation hole 36 and the normal line direction of the sensor detecting face 28c, so the return of a portion of the puncture repair liquid that has spread in film form onto the wall surfaces of the internal space 38, which has a sufficiently larger area compared with the inside opening part 36a, to the inside opening part 36a will rarely occur. Therefore, adhesion of the drop D or a small droplet to the inside opening part 36a within the internal space 38 or adhesion to the periphery thereof and blockage of the ventilation hole 36 rarely occurs.

Figure 9:
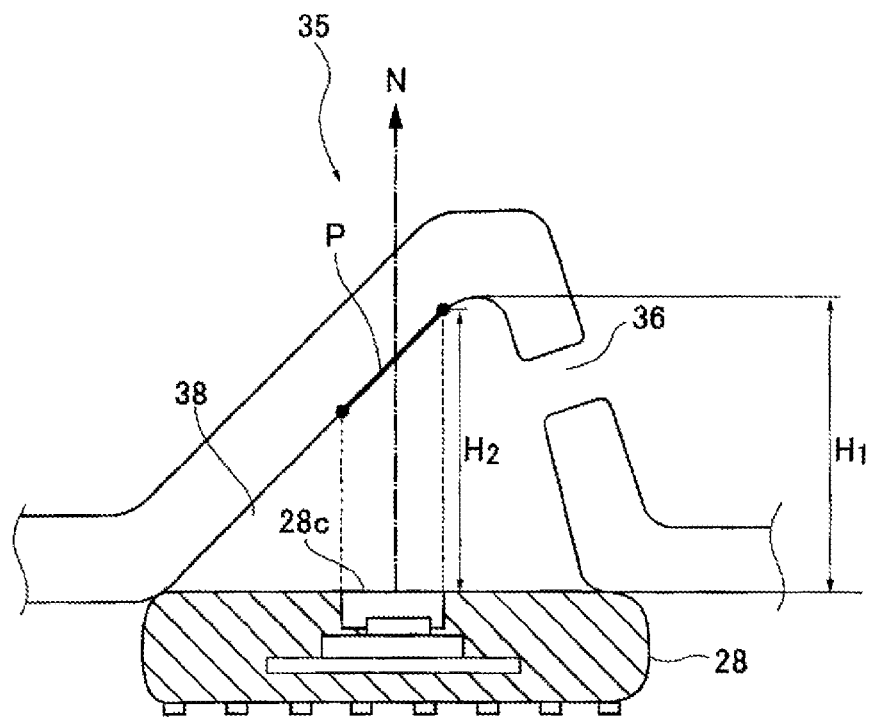
FIG. 9 is a view illustrating more specifically the positional relationship among the ventilation hole, the internal space, and the sensor detection surface illustrated in FIG. 7.
Figure 10:
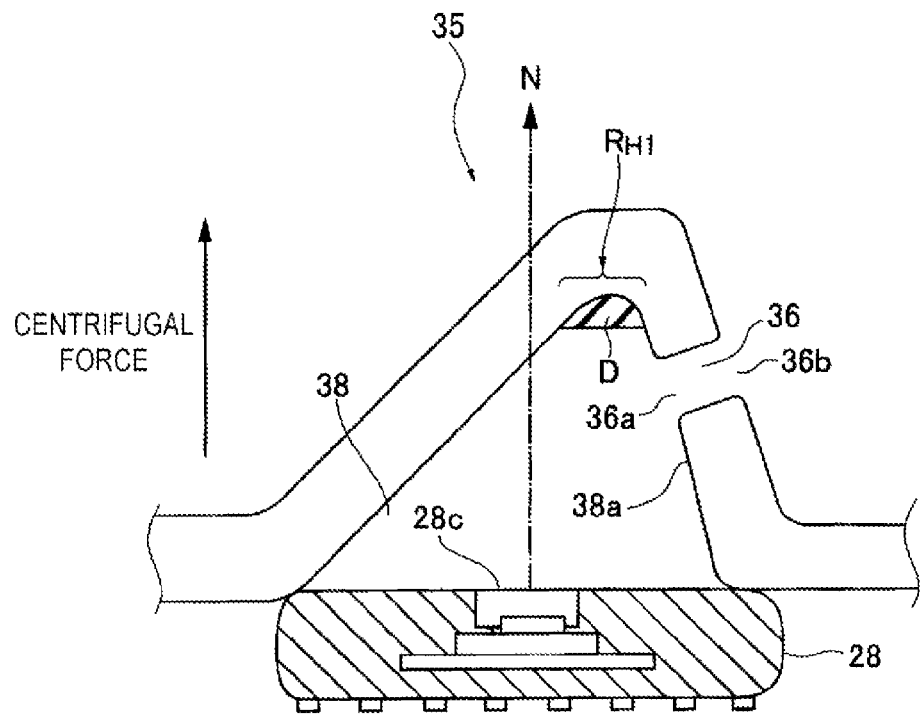
FIG. 10 is an explanatory view of the puncture repair liquid trap within the projection illustrated in FIG. 8.

FIG. 9 more specifically illustrates the positional relationship among the ventilation hole 36, the internal space 38, and the sensor detecting face 28c. The projection region P (the thick line portion in FIG. 9) is a region on the inner wall surface obtained by projecting the sensor detecting face 28c along the normal line direction of the sensor detecting face 28c onto the inner wall surface of the internal space 38. At this time, the maximum height $H_1$ of the heights of the inner wall surface of the internal space measured along the normal line direction with reference to the sensor detecting face 28c is higher compared with the maximum height $H_2$ of the heights of the projection region P measured along the normal line direction with reference to the sensor detecting face 28c. By increasing the maximum height $H_1$ compared with the maximum height $H_2$, then if a centrifugal force acts along the normal line direction N of the sensor detecting face 28c, the drop D collects in around the maximum height $H_1$ as illustrated in FIG. 10, and in this position hardens, so ingress of the liquid drop D into the ventilation hole 36 from the inside opening part 36a and hardening rarely occurs.

Figure 11:
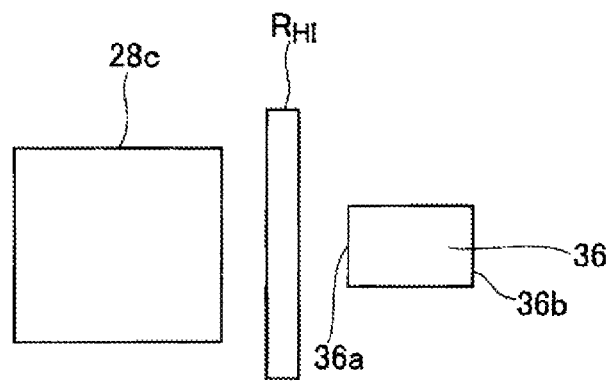
FIG. 11 illustrates a more specific example of the positional relationship among the ventilation hole, the internal space, and the sensor detection surface illustrated in FIG. 7.

In addition, a maximum height region $R_{H1}$ is defined having the maximum height of the heights of the inner wall surfaces of the internal space 38 measured with reference to the sensor detecting face 28c. At this time, as illustrated in FIG. 11, preferably the maximum height region $R_{H1}$ is located between the inside opening part 36a of the ventilation hole 36 and the sensor detecting face 28c when the ventilation hole 36 and the sensor detecting face 28c are viewed planarly from a direction normal to the sensor detecting face 28c. By disposing the sensor detecting face 28c, the maximum height region $R_{H1}$, and the ventilation hole 36 in this positional relationship, when the centrifugal force acts in the upper direction in the plane of the paper as illustrated in FIG. 10, it is possible to reliably trap the liquid drop D around the maximum height region $R_{H1}$, so ingress of the liquid drop D into the ventilation hole 36 from the inside opening part 36a and hardening rarely occurs.

In particular, preferably when the ventilation hole 36 is virtually extended into the internal space 38, the virtually extended portion of the ventilation hole 36 contacts the inner wall surface of the internal space 38, and not the sensor detecting face 28c. In this case liquid drops D that penetrate into the internal space 38 through the ventilation hole 36 mostly contact the inner wall surface of the internal space 38, and liquid drops D rarely directly contact and adhere to the sensor detecting face 28c from the ventilation hole 36 and harden. Also, because the liquid drops D mainly strike the inner wall surface of the internal space 38, the liquid drops D spread into a film form at a location on the wall surface separated from the sensor detecting face 28c. However, because the puncture repair liquid spreads into a film form on the wall surface of the internal space 38, which has an area sufficiently larger than that of the inside opening part 36a, it rarely occurs that a portion of the puncture repair liquid returns to the inside opening part 36a of the ventilation hole 36. Therefore, the occurrence of ingress and hardening of the liquid drops D in the ventilation hole 36 from the inside opening part 36a is further reduced.

Also, as illustrated in FIGS. 8 to 11, preferably the outside opening part of the ventilation hole 36 that faces the tire cavity region is provided on the inclined face of the projection that projects from the outside wall surface of the housing 22 and that is inclined with respect to the sensor detecting face 28c. Here, the inclined face also includes a wall surface normal to the sensor detecting face 28c. By providing the outside opening part of the ventilation hole 36 on the inclined face that is inclined with respect to the sensor detecting face 28c in this way, the angle θ can easily be made in the range of not less than 10 degrees and not more than 120 degrees.

Figure 12:
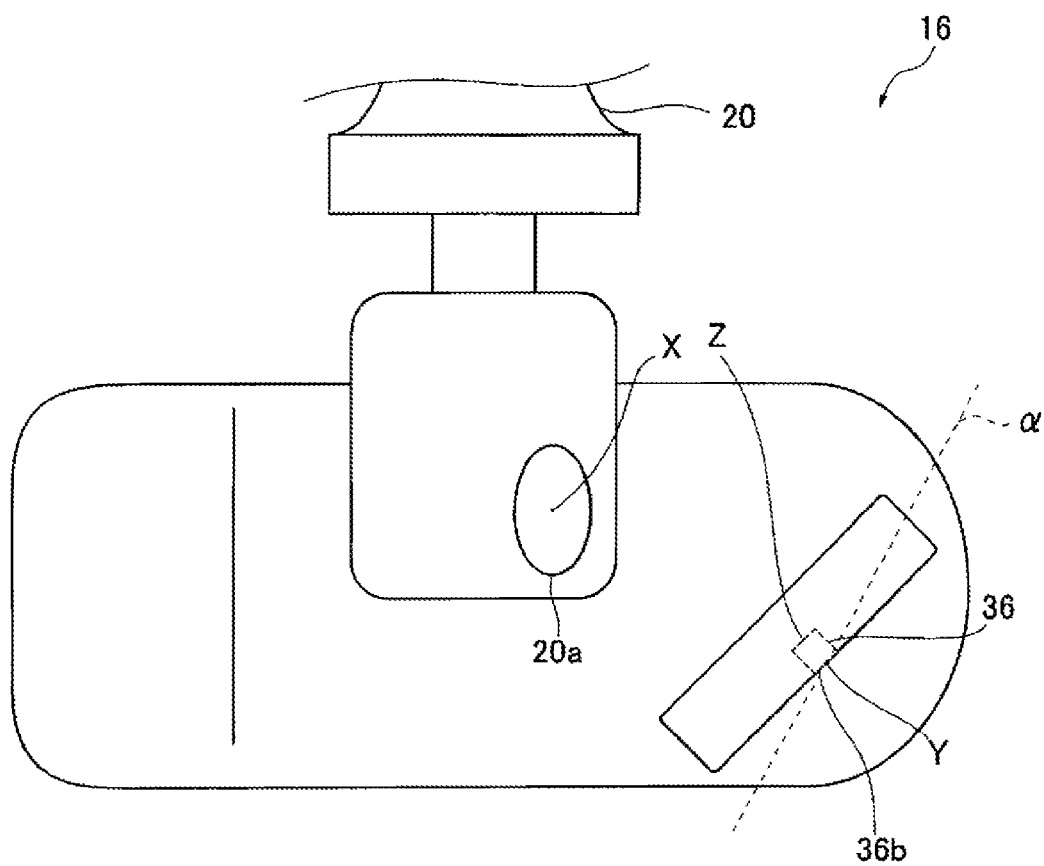
FIG. 12 illustrates a more preferred example of the positional relationship among the ventilation hole, the internal space, and the sensor detection surface illustrated in FIG. 7.

FIG. 12 is a plan view of a more preferred example of the positional relationship among the ventilation hole, the internal space, and the sensor detecting face illustrated in FIG. 7, when viewed planarly from the direction normal to the sensor detecting face 28c. As illustrated in FIG. 3, the transmitter 30 is provided connected to the tire valve 20 for filling the tire 14 with air. The center position X (see FIG. 12) of an air inlet 20a (see FIG. 12) on the tire cavity region side where the air is introduced into the tire cavity region from the tire valve 20, the center position Y (see FIG. 12) of the outside opening part 36b (see FIG. 12) of the ventilation hole 36 which is in contact with the tire cavity region, and the center position Z (see FIG. 12) of the inside opening part 36a are viewed planarly from the direction normal to the sensor detecting face 28c. Also, consider a virtual plane normal to the straight line from the center position X of the air inlet 20a to the center position Y of the outside opening part 36b, which is the virtual plane that passes through the center position Y of the outside opening part 36b. At this time, as illustrated in FIG. 12, preferably the center position Z of the inside opening part 36a is positioned on the same side as the center position X of the air inlet 20a of a virtual line α corresponding to the virtual plane when viewed planarly from the direction normal to the sensor detecting face 28c as boundary line. The virtual line α is a straight line passing through the center position Y of the outside opening part 36b. When the tire 19 is punctured, puncture repair liquid is passed from the tire valve 20 through the air inlet 20a into the tire cavity region, so the puncture repair liquid is introduced vigorously into the tire cavity region from the air inlet 20a of the transmitter 30. However, by providing the ventilation hole 36 so that the center position Z of the inside opening part 36a of the ventilation hole 36 is on the same side as the center position X of the air inlet 20a with the virtual line α as the boundary line, little of the puncture repair liquid introduced from the air inlet 20a directly adheres to the outside opening part 36b of the ventilation hole 36 and penetrates into the ventilation hole 36.

Modified Examples 1 TO 5

Figure 13A:
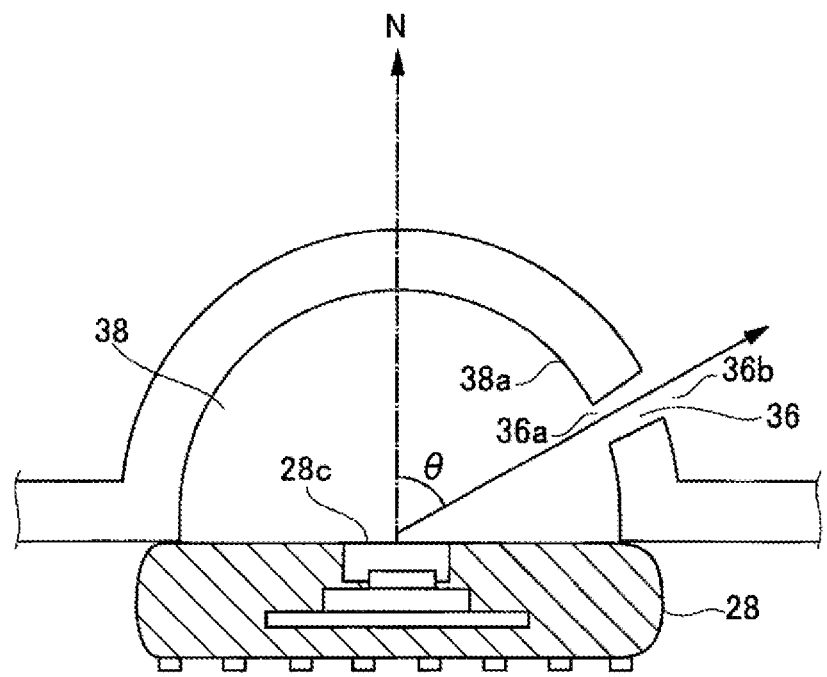
FIG. 13A illustrates a first modified example of the present embodiment.
Figure 13B:
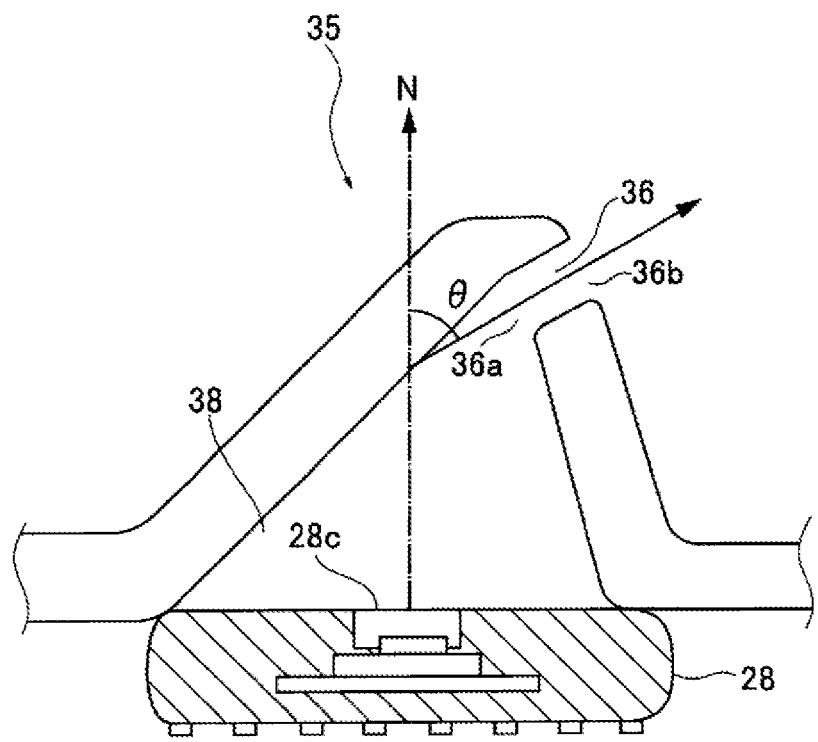
FIG. 13B illustrates a second modified example of the present embodiment.
Figure 13C:
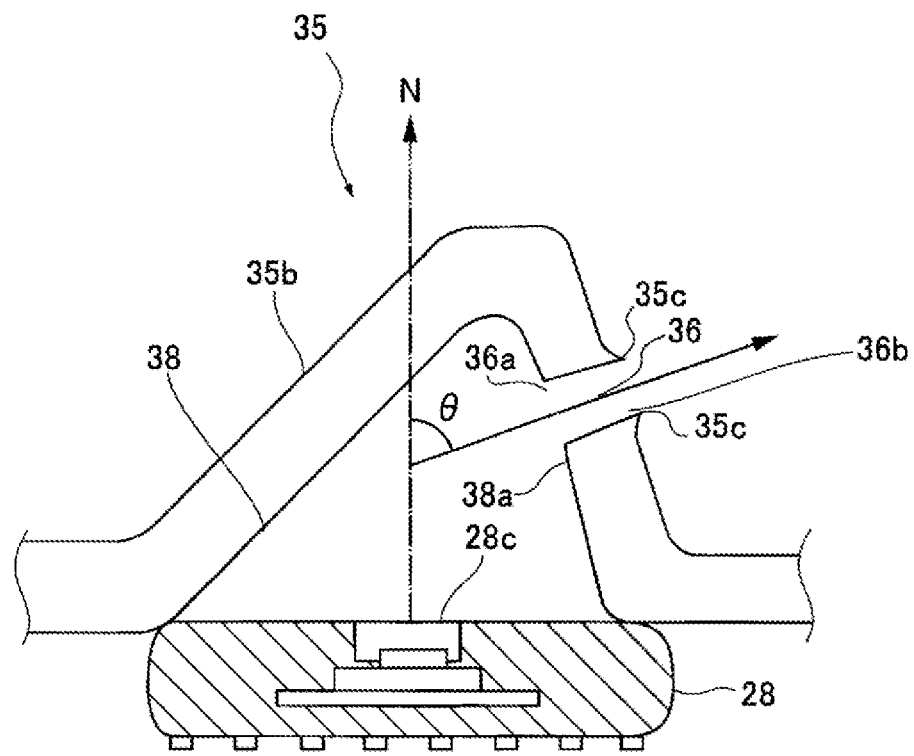
FIG. 13C illustrates a third modified example of the present embodiment.

FIGS. 13A to 13C illustrate Modified Examples 1, 2, 3 of the present embodiment. In each of Modified Examples 1 to 3, the angle θ between the extension direction of the ventilation hole 36 and the normal line direction of the sensor detecting face 28c is not less than 10 degrees and not more than 120 degrees. In addition, the inside opening part 36a of the ventilation hole 36 that is in contact with the internal space 38 is oriented in a direction that is inclined with respect to the sensor detecting face 28c, and wall surface 38a of the internal space is provided extending in the direction perpendicular to the normal line direction of the sensor detecting face 28c and the extension direction of the ventilation hole 36. Therefore, they have the same effect as the present embodiment as described above.

In Modified Example 1 illustrated in FIG. 13A, a spherical-shaped projection 35 that projects from the outer wall surface is provided on the outer wall surface of the housing 22. The inner wall surface 38 of the spherical-shaped projection 35 is the wall surface of the internal space 38 formed in a spherical shape, and the wall surface extends at least in the direction perpendicular to the normal line direction of the sensor detecting face 28c and the extension direction of the ventilation hole 36. In other words, the wall surface 38a of the internal space that extends in the direction perpendicular to the normal line direction of the sensor detecting face 28c and the extension direction of the ventilation hole 36 has the wall surface formed in a spherical surface shape.

In Modified Example 2 illustrated in FIG. 13B, the projection 35 that projects from the outer wall surface of the housing 22 is provided on the outer wall surface. The projection 35 extends in the direction normal to the plane of the paper in FIG. 13B. In Modified Example 2 also, the maximum height $H_1$ of the heights of the inner wall surface of the internal space is higher compared with the maximum height $H_2$ of the heights in the projection region P measured along the normal line direction with reference to the sensor detecting face 28c. However, the maximum height $H_1$ and the maximum height of the inside opening part 36a of the ventilation hole 36 from the sensor detecting face 28c are the same, so it is not possible to trap the puncture repair liquid in the maximum height region $R_{H1}$ as illustrated in FIG. 10. However, the inside opening part 36a of the ventilation hole 36 that is in contact with the internal space 38 is oriented in a direction that is inclined with respect to the sensor detecting face 28c, and the wall surface 38a of the internal space is provided extending in the direction perpendicular to the normal line direction of the sensor detecting face 28c and the extension direction of the ventilation hole 36. Therefore the portion of the puncture repair liquid that returns to the inside opening part 36a is very small, the same as for the embodiment as described above.

In Modified Example 3 as illustrated in FIG. 13C, the outside opening part 36b of the projection 35 of the housing 22 is surrounded by a protrusion 35c. By providing the protrusion 35c in this way, even if puncture repair liquid adhering to the housing 22 flows along the outer wall surface of the housing 22 and arrives at the outside opening part 36b, it cannot approach the outside opening part 36b because of the protrusion 35c. Therefore, it is possible to prevent tire puncture repair liquid from penetrating into the ventilation hole 36 by the protrusion 35c.

Figure 13D:
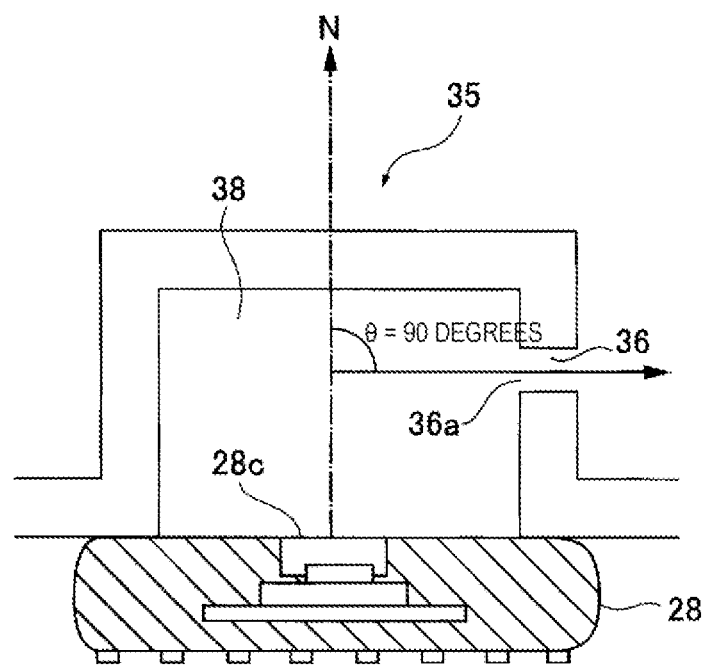
FIG. 13D illustrates a fourth modified example of the present embodiment.

FIG. 13D illustrates Modified Example 4. In Modified Example 4, the projection 35 extends in the direction normal to the plane of the paper in FIG. 13D. Namely, in Modified Example 4, the inside opening part 36a of the ventilation hole 36 facing the internal space 38 is set (inclined) in a direction normal to the sensor detecting face 28c, and, is provided on the wall surface of the internal space 38 that extends in the direction perpendicular to both the extension direction of the ventilation hole 36 and the normal line direction of the sensor detecting face 28c (the direction normal to the plane of the paper in FIG. 13D). The angle between the extension direction of the ventilation hole 36 and the normal line direction N of the sensor detecting face 28c is 90 degrees. Therefore, Modified Example 4 also has the same effect as the embodiment illustrated in FIG. 7 as described above.

Figure 13E:
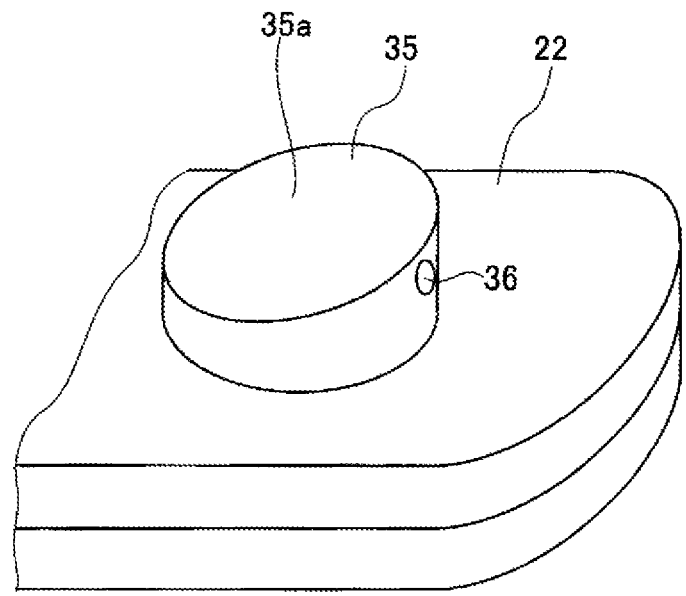
FIG. 13E illustrates a fifth modified example of the present embodiment.
Figure 13F:
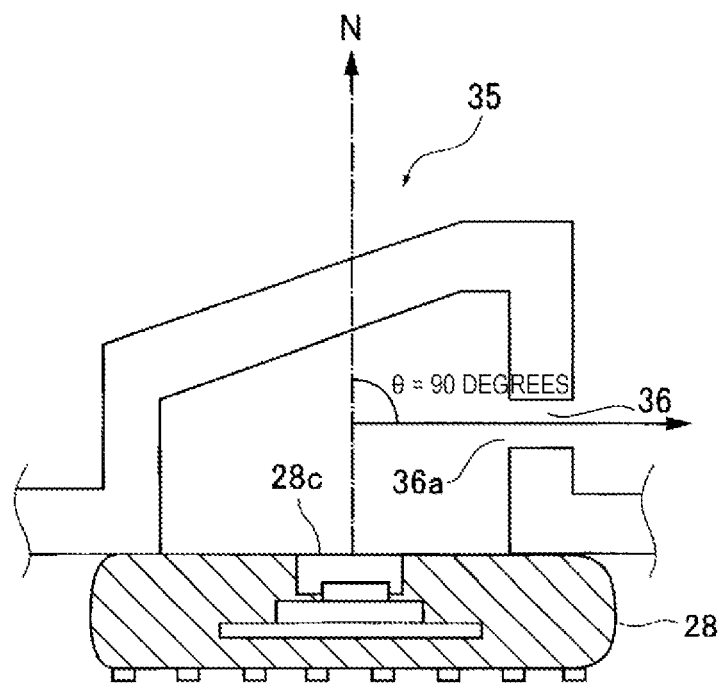
FIG. 13F illustrates a fifth modified example of the present embodiment.

FIGS. 13E and 13F illustrate Modified Example 5. In Modified Example 5, the projection 35 projects in a circular cylindrical shape, and the surface 35a of the projection tip is inclined with respect to the outer wall surface of the housing 22. In Modified Example 5, the inside opening part 36a of the ventilation hole 36 facing the internal space 38 is set (inclined) in a direction normal to the sensor detecting face 28c, and, is provided on the wall surface of the internal space 38 that extends in the direction perpendicular to both the extension direction of the ventilation hole 36 and the normal line direction of the sensor detecting face 28c (the direction normal to the plane of the paper in FIG. 13F). In Modified Example 5, the surface on which the inside opening part 36a of the ventilation hole 36 is provided is a side surface that is curved as a curved surface of a circular cylindrical shape, but extends in the direction normal to the plane of the paper in FIG. 13F. This curved surface is also included in the wall surface of the internal space 38 extending in a direction perpendicular to both the extension direction of the ventilation hole 36 and the normal line direction N of the sensor detecting face 28c. Also, the angle between the extension direction of the ventilation hole 36 in Modified Example 5 and the normal line direction N of the sensor detecting face 28c is 90 degrees. Therefore, Modified Example 5 also has the same effect as the embodiment illustrated in FIG. 7 as described above.

Working Examples

To investigate the effect of the present embodiment, various changes were made to the form of the ventilation hole 36 of the housing 22, and the tire travel time until it was not possible to correctly measure the air pressure was investigated.

Figure 14:
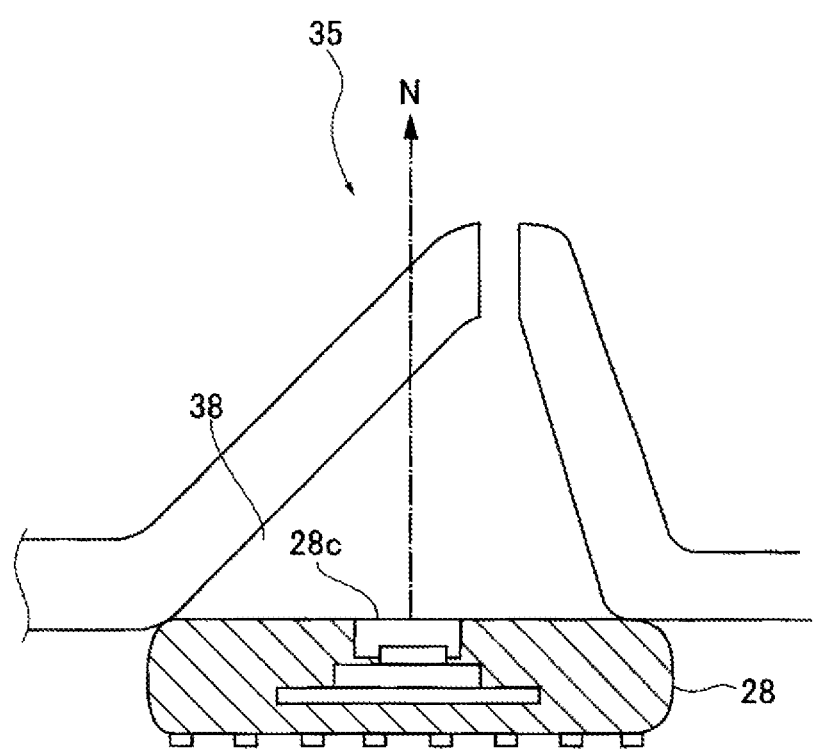
FIG. 14 is an explanatory view of the positional relationship among the ventilation hole, internal space, and sensor detection surface used in a Comparative Example.

Specifically, a transmitting device 16 was provided within the tire cavity region of a 195/65R15 tire 14, and puncture repair liquid was introduced into the tire cavity region. The air pressure of the tire 14 was 200 kPa. A traveling test was carried out on the tire 14 at 30 km/h using a laboratory drum test. Traveling for 30 minutes was one traveling step, and after each traveling step the traveling was stopped, the tire air pressure was reduced by 50 kPa, and the tire air pressure was measured. The air pressure was obtained using the monitoring device 18. If the correct air pressure was detected, in other words if the pressure data indicated a reduction of 50 kPa, the air pressure was then increased by 50 kPa to the original pressure, and traveling was repeated again. In this tire traveling test, the traveling time of the tire was measured until it was not possible to measure the correct air pressure. The upper limit on traveling time was 48 hours, and if it was possible to correctly measure the air pressure during this time, it was evaluated that it was possible to measure the correct air pressure for a long period of time even if the puncture repair liquid was injected. Even if 48 hours traveling time was not reached, if the traveling time was 5 hours or more, it was considered to be a success. In the following tables 1 and 2, those that achieved the success level are indicated by "Success", and those that did not reach this level are indicated as "Fail". FIG. 14 is an explanatory view illustrating the positional relationship among the ventilation hole 36, the internal space 38, and the sensor detection surface 28a used in Comparative Example 3. In all examples, the sensor was provided so that the normal line direction of the sensor detecting face was the outer side direction in the tire radial direction.

TABLE 1

|  | Comparative Example 1 | Comparative Example 2 | Working Example 1 | Working Example 2 | Working Example 3 | Working Example 4 | Working Example 5 |
|---|---|---|---|---|---|---|---|
| Form of ventilation hole | FIG. 7 | FIG. 7 | FIG. 7 | FIG. 7 | FIG. 7 | FIG. 7 | FIG. 7 |
| Angle θ | 5° | 130° | 10° | 30° | 60° | 90° | 120° |
| Puncture repair test | Fail | Fail | Success | Success | Success | Success | Success |

TABLE 2

|  | Comparative Example 3 | Comparative Example 4 | Working Example 6 | Working Example 7 | Working Example 8 | Working Example 9 | Working Example 10 |
|---|---|---|---|---|---|---|---|
| Form | FIG. 14 | FIG. 13B | FIG. 13B | FIG. 13B | FIG. 13B | FIG. 13A | FIG. 13A |
| Angle θ | 0° | 5° | 10° | 60° | 90° | 30° | 60° |
| Puncture repair test | Fail | Fail | Success | Success | Success | Success | Success |

In Comparative Example 2 in which the angle θ was 130 degrees, puncture repair liquid that adhered to the outer wall surface of the housing 22 was moved to the position of the ventilation hole 36 by the centrifugal force of the traveling and a portion of the puncture repair liquid penetrated into the ventilation hole 36, so the puncture repair liquid hardened in the ventilation hole 36, and the puncture repair test was a failure.

From the above it can be seen that when the angle θ is not less than 10 degrees and not more that 120 degrees, and if the form of the ventilation hole 36 is as illustrated in FIG. 7 or the form as illustrated in FIG. 13, the success level of the puncture repair test can be achieved. With the form illustrated in FIG. 13A, Working Examples 9 and 10 in which the angle θ was not less than 10 degrees and not more than 120 degrees achieved the success level of the puncture repair test.

This clearly demonstrates the effect of the present embodiment.

The transmitting device and the tire condition monitoring system according to the present technology have been described in detail above, but the present technology is not limited to the embodiments as described above, and various improvements or modifications can be made without departing from the scope of the present technology.

What is claimed is:

1. A transmitting device provided in a tire cavity region, the transmitter device transmitting tire information regarding a tire condition, comprising:
   a sensor having a plane sensor detecting face sensing as tire information a condition of air filling a tire cavity region enclosed by a tire and a rim;
   a transmitter wirelessly transmitting the detected tire information; and
   a housing within which the sensor and the transmitter are provided, including an internal space in contact with the sensor detecting face of the sensor, and a ventilation hole communicating with the internal space and the tire cavity region and extending in a linear manner,
   wherein an inside opening part of the ventilation hole facing the internal space is provided on a wall surface of the internal space, the wall surface being inclined with respect to the sensor detecting face, and
   an angle θ between a normal line direction of the wall surface and a normal line direction of the sensor detecting face is not less than 10 degrees and not more than 120 degrees.

2. A transmitting device provided in a tire cavity region, the transmitter device transmitting tire information regarding the tire condition, comprising:
   a sensor having a plane sensor detecting face sensing as tire information a condition of air filling a tire cavity region enclosed by a tire and a rim;
   a transmitter wirelessly transmitting the detected tire information; and
   a housing within which the sensor and the transmitter are provided, including an internal space in contact with the sensor detecting face of the sensor, and a ventilation hole communicating with the internal space and the tire cavity region and extending in a linear manner,
   wherein an inside opening part of the ventilation hole facing the internal space is inclined with respect to the sensor detecting face, and, is provided on a wall surface of the internal space, the wall surface extending in a direction perpendicular to both an extension direction of the ventilation hole and a normal line direction of the sensor detecting face,
   an angle θ between the extension direction of the ventilation hole and the normal line direction of the sensor detecting face is not less than 10 degrees and not more than 120 degrees
   a projection region is a region on an inner wall surface of the internal space obtained by projecting the sensor detecting face along the normal line direction onto the inner wall surface, and
   a maximum height $H_1$ of heights of an inner wall surface of the internal space measured along the normal line direction with reference to the sensor detecting face is higher compared with a maximum height $H_2$ of heights of the projection region measured along the normal line direction with reference to the sensor detecting face.

3. The transmitting device according to claim 1, wherein when the ventilation hole is extended virtually into the internal space, a virtually extended portion of the ventilation hole contacts an inner wall surface of the housing facing the internal space, not the sensor detecting face.

4. A transmitting device provided in a tire cavity region, the transmitter device transmitting tire information regarding the tire condition, comprising:
   a sensor having a plane sensor detecting face sensing as tire information a condition of air filling a tire cavity region enclosed by a tire and a rim;
   a transmitter wirelessly transmitting the detected tire information; and
   a housing within which the sensor and the transmitter are provided, including an internal space in contact with the sensor detecting face of the sensor, and a ventilation hole communicating with the internal space and the tire cavity region and extending in a linear manner,
   wherein an inside opening part of the ventilation hole facing the internal space is inclined with respect to the sensor detecting face, and, is provided on a wall surface of the internal space, the wall surface extending in a direction perpendicular to both an extension direction of the ventilation hole and a normal line direction of the sensor detecting face,
   an angle θ between the extension direction of the ventilation hole and the normal line direction of the sensor detecting face is not less than 10 degrees and not more than 120 degrees, and
   an outside opening part of the ventilation hole facing the tire cavity region is provided on an inclined face of a projection projecting from an outer wall surface of the housing, the inclined face being inclined with respect to the sensor detecting face.

5. The transmitting device according to claim 4, wherein the internal space is a space defined by an inner wall surface in the projection of the housing, and a peripheral surface of the sensor including the sensor detecting face.

6. A transmitting device provided in a tire cavity region, the transmitter device transmitting tire information regarding the tire condition, comprising:
   a sensor having a plane sensor detecting face sensing as tire information a condition of air filling a tire cavity region enclosed by a tire and a rim;
   a transmitter wirelessly transmitting the detected tire information; and
   a housing within which the sensor and the transmitter are provided, including an internal space in contact with the sensor detecting face of the sensor, and a ventilation hole communicating with the internal space and the tire cavity region and extending in a linear manner,
   wherein an inside opening part of the ventilation hole facing the internal space is inclined with respect to the sensor detecting face, and, is provided on a wall surface of the internal space, the wall surface extending in a direction perpendicular to both an extension direction of the ventilation hole and a normal line direction of the sensor detecting face,
   an angle θ between the extension direction of the ventilation hole and the normal line direction of the sensor detecting face is not less than 10 degrees and not more than 120 degrees,
   the transmitting device is connected to a tire valve for filling a tire with air, and
   when a center position of an air inlet on a tire cavity region side at which air is introduced into the tire cavity region from the tire valve, a center position of an outside opening part of the ventilation hole facing the tire cavity region, and a center position of the inside opening part are viewed planarly from a direction normal to the sensor detecting face, and a virtual plane is considered normal to a straight line from a center position of the air inlet towards a center position of the outside opening part, the virtual plane passing through the center position of the outside opening part viewed planarly, the center position of the inside opening part is positioned on a same side as the center position of the air inlet of a virtual line corresponding to the virtual plane when viewed planarly from a direction normal to the sensor detecting face as boundary.

7. The transmitting device according to claim 1, wherein a maximum height region having a maximum height of heights of an inner wall surface of the internal space measured with reference to the sensor detecting face is positioned between the inside opening part of the ventilation hole and the sensor detecting face when the maximum height region, the ventilation hole, and the sensor detecting face are viewed planarly from a direction normal to the sensor detecting face.

8. A tire condition monitoring system, comprising:
a transmitting device, a receiving device, and a monitoring unit,
wherein the transmitting device includes,
a sensor having a plane sensor detecting face sensing as tire information a condition of air filling a tire cavity region enclosed by a tire and a rim;
a transmitter that wirelessly transmits the detected tire information; and
a housing within which the sensor and the transmitter are provided, including an internal space in contact with the sensor detecting face of the sensor, and a ventilation hole communicating with the internal space and the tire cavity region and extending in a linear manner,
wherein an inside opening part of the ventilation hole facing the internal space is provided on a wall surface of the internal space, the wall surface being inclined with respect to the sensor detecting face, and
an angle θ between a normal line direction of the wall surface and a normal line direction of the sensor detecting face is not less than 10 degrees and not more than 120 degrees,
the receiving device receives the tire information transmitted from the transmitting device, and
the monitoring unit determines a presence or absence of an abnormality of the tire on a basis of the tire information.

9. A tire assembly, comprising:
a tire;
a rim fitted to the tire; and
a transmitting device provided in a tire cavity region between the tire and the rim, and transmitting tire information regarding a tire condition,
wherein the transmitting device includes,
a sensor having a plane sensor detecting face sensing as tire information a condition of air filling a tire cavity region enclosed by a tire and a rim;
a transmitter that wirelessly transmits the detected tire information; and
a housing within which the sensor and the transmitter are provided, including an internal space in contact with the sensor detecting face of the sensor, and a ventilation hole communicating with the internal space and the tire cavity region and extending in a linear manner,
wherein an inside opening part of the ventilation hole facing the internal space is provided on a wall surface of the internal s ace the wall surface being inclined with respect to the sensor detecting face, and an angle θ between a normal line direction of the wall surface and a normal line direction of the sensor detecting face is not less than 10 degrees and not more than 120 degrees.

10. The tire assembly according to claim 9, wherein the angle between the normal line direction of the sensor detecting face and an outer side direction in a tire radial direction is between 0 degrees and 15 degrees.

11. A tire assembly, comprising:
a tire.
a rim fitted to the tire; and
a transmitting device provided in a tire cavity region between the tire and the rim, and transmitting tire information regarding the tire condition,
wherein the transmitting device includes,
a sensor having a plane sensor detecting face sensing as tire information a condition of air filling a tire cavity region enclosed by a tire and a rim;
a transmitter that wirelessly transmits the detected tire information; and
a housing within which the sensor and the transmitter are provided, including an internal space in contact with the sensor detecting face of the sensor, and a ventilation hole communicating with the internal space and the tire cavity region and extending in a linear manner,
wherein an inside opening part of the ventilation hole facing the internal space is inclined with respect to the sensor detecting face, and, is provided on a wall surface of the internal space, the wall surface extending in a direction perpendicular to both an extension direction of the ventilation hole and a normal line direction of the sensor detecting face,
an angle θ between the extension direction of the ventilation hole and the normal line direction of the sensor detecting face is not less than 10 degrees and not more than 120 degrees,
a projection region is a region on an inner wall surface of the internal space obtained by projecting the sensor detecting face along the normal line direction onto the inner wall surface, and
a maximum height $H_1$ of heights of an inner wall surface of the internal space measured along the normal line direction with reference to the sensor detecting face is higher compared with a maximum height $H_2$ of heights of the projection region measured along the normal line direction with reference to the sensor detecting face.

12. The tire assembly according to claim 9, wherein when the ventilation hole is extended virtually into the internal space, a virtually extended portion of the ventilation hole contacts an inner wall surface of the housing facing the internal space, not the sensor detecting face.

13. A tire assembly, comprising:
a tire;
a rim fitted to the tire; and
a transmitting device provided in a tire cavity region between the tire and the rim, and transmitting tire information regarding the tire condition,
wherein the transmitting device includes,
a sensor having a plane sensor detecting face sensing as tire information a condition of air filling a tire cavity region enclosed by a tire and a rim;
a transmitter that wirelessly transmits the detected tire information; and
a housing within which the sensor and the transmitter are provided, including an internal space in contact with the sensor detecting face of the sensor, and a ventilation hole communicating with the internal space and the tire cavity region and extending in a linear manner, wherein an inside opening part of the ventilation hole facing the internal space is inclined with respect to the sensor detecting face, and, is provided on a wall surface of the internal space, the wall surface extending in a direction perpendicular to both an extension direction of the ventilation hole and a normal line direction of the sensor detecting face, an angle θ between the extension direction of the ventilation hole and the normal line direction of the sensor detecting face is not less than 10 degrees and not more than 120 degrees, and an outside opening part of the ventilation hole facing the tire cavity region is provided on an inclined face of a projection projecting from an outer wall surface of the housing, the inclined face being inclined with respect to the sensor detecting face.

14. The tire assembly according to claim 13, wherein the internal space is a space defined by an inner wall surface in the projection of the housing, and a peripheral surface of the sensor including the sensor detecting face.

15. A tire assembly, comprising:
a tire;
a rim fitted to the tire; and
a transmitting device provided in a tire cavity region between the tire and the rim, and transmitting tire information regarding the tire condition,
wherein the transmitting device includes,
a sensor having a plane sensor detecting face sensing as tire information a condition of air filling a tire cavity region enclosed by a tire and a rim;
a transmitter that wirelessly transmits the detected tire information; and
a housing within which the sensor and the transmitter are provided, including an internal space in contact with the sensor detecting face of the sensor, and a ventilation hole communicating with the internal space and the tire cavity region and extending in a linear manner, wherein an inside opening part of the ventilation hole facing the internal space is inclined with respect to the sensor detecting face, and, is provided on a wall surface of the internal space, the wall surface extending in a direction perpendicular to both an extension direction of the ventilation hole and a normal line direction of the sensor detecting face, an angle θ between the extension direction of the ventilation hole and the normal line direction of the sensor detecting face is not less than 10 degrees and not more than 120 degrees the transmitting device is connected to a tire valve for filling a tire with air, and when a center position of an air inlet on a tire cavity region side at which air is introduced into the tire cavity region from the tire valve, a center position of the outside opening part of the ventilation hole facing the tire cavity region, and a center position of the inside opening part are viewed planarly from a direction normal to the sensor detecting face, and a virtual plane is considered normal to a straight line from a center position of the air inlet towards a center position of the outside opening part, the virtual plane passing through a center position of the outside opening part viewed planarly, the center position of the inside opening part is positioned on a same side as the center position of the air inlet of a virtual line corresponding to the virtual plane when viewed planarly from a direction normal to the sensor detecting face as boundary.

16. The tire assembly according to claim 9, wherein a maximum height region having a maximum height of heights of an inner wall surface of the internal space measured with reference to the sensor detecting face is positioned between the inside opening part of the ventilation hole and the sensor detecting face when the maximum height region, the ventilation hole, and the sensor detecting face are viewed planarly from a direction normal to the sensor detecting face.

* * * * *